UNITED STATES PATENT OFFICE.

ALFRED NOBEL, OF HAMBURG, GERMANY, ASSIGNOR TO THE UNITED STATES BLASTING-OIL COMPANY, OF NEW YORK, N. Y.

IMPROVEMENT IN USEFUL COMPOUNDS CONTAINING NITRO-GLYCERINE.

Specification forming part of Letters Patent No. 50,617, dated October 24, 1865; reissue No. 3,380, dated April 13, 1869; reissue No. 4,818, dated March 19, 1872.

DIVISION D.

SPECIFICATION.

*To all whom it may concern:*

Be it known that ALFRED NOBEL, of the city of Hamburg, Germany, has invented certain new and useful Improvements in the Manufacture of Nitro-Glycerine and certain compounds thereof, and in the utilization, as explosives, of nitro-glycerine and the analogous substances known as nitrates of ethyl and of methyl and nitro-manite.

The improvement in the manufacture of nitro-glycerine is the subject of a separate specification; this specification having reference to certain modes of utilizing, as explosives, nitro-glycerine and the analogous substances above mentioned.

There is a class of explosives long known, but not at the date of NOBEL'S invention applied to technical purposes, in consequence of practical difficulties in procuring their explosion. Such substances are nitro-glycerine, the nitrates of ethyl and of methyl and nitro-manite. These substances are liquid at ordinary temperatures, and by that characteristic are distinguishable from solid explosives, such as gunpowder, gun-cotton, &c.; and they have also the property that fire may be applied to them without their exploding. Nitro-glycerine, for example, if ignited in an open space, is slowly decomposed and takes fire, but the flame is apt to die out when the match is withdrawn; hence it cannot under ordinary circumstances be looked upon as a ready explosive agent, for while gunpowder and other substances used as explosives prior to NOBEL'S invention, always explode or deflagrate throughout their whole mass when fire is set to them, nitro-glycerine and the analogous substances before named will not explode from the mere contact of flame. So, also, if a drop of nitro-glycerine be poured on an anvil, the blow of a hammer causes it to explode, but only that part is involved which has received the blow, so that in this case the explosion is merely a local one.

A principal object of NOBEL'S invention consists in the removal of this obstacle to the use of nitro-glycerine and the analogous substances before named, as explosives. For this end two different methods have been invented by NOBEL for promoting the explosion of nitro-glycerine. One method, which forms the subject of this patent, relates to a compound with nitro-glycerine of other more easily explosive substances; and the other method, which is described in a separate specification, relates to the means of effecting the explosion.

NOBEL discovered that the difficulty experienced in effecting the explosion of nitro-glycerine, and the analogous substances before mentioned, could be overcome by mixing or combining them with gunpowder, gun-cotton, or other similar substance. This mixing may be effected in any convenient manner, and the proportions in which they are to be combined may be varied to suit the pleasure or convenience of the user or manufacturer. The nitro-glycerine may be mixed with gunpowder or gun-cotton, either of which will absorb a considerable quantity of nitro-glycerine—say thirty per cent., more or less—in such proportions as to make the compound either wet or comparatively dry. If mixed with gunpowder, it may be either absorbed with it by pouring the nitro-glycerine on the mass of gunpowder, or the two may be mingled together by trituration, the powder in the nitro-glycerine.

The effect of these combinations will produce an explosive especially suitable for certain blasting purposes—for example, in crevice rock—and greatly superior either to gunpowder or gun-cotton in explosive force, and quite readily exploded, so that it may be fired and exploded by means of a match or electric spark in like manner as gunpowder or gun-cotton alone. By means of this combination with gunpowder, gun-cotton, or other similar readily explosive substances, of nitro-glycerine, and the analogous substances before named, which are liquid at the ordinary temperature, these substances which had not at the date of NOBEL'S invention been applied to any technical use as explosives, owing to their difficulty of explosion, have been introduced from the domain of science into that of practical use in the arts, and have rendered of commercial value what was previously known as a mere chemical curiosity.

We therefore claim as the invention of said

ALFRED NOBEL, and desire to secure by Letters Patent, in the name of the United States Blasting-Oil Company, as assignee of said NOBEL:

1. The utilization, as explosives, of nitro-glycerine, and the analogous liquid substances hereinbefore mentioned, by combining therewith gunpowder, gun-cotton, or other similar substance developing a rapid heat on combustion, substantially as hereinbefore described.

2. The combination of gunpowder with nitro-glycerine, substantially as and for the purposes hereinbefore described.

3. The combination of gun-cotton with nitro-glycerine, substantially as and for the purposes hereinbefore described.

In witness whereof the said THE UNITED STATES BLASTING-OIL COMPANY, by TAL. P. SHAFFNER, President, have hereunto set their hand.

THE UNITED STATES BLASTING-OIL CO.,
By TAL. P. SHAFFNER, *President.*

Witnesses:
OCTAVIUS KNIGHT,
EDM. F. BROWN.